Figure 5:
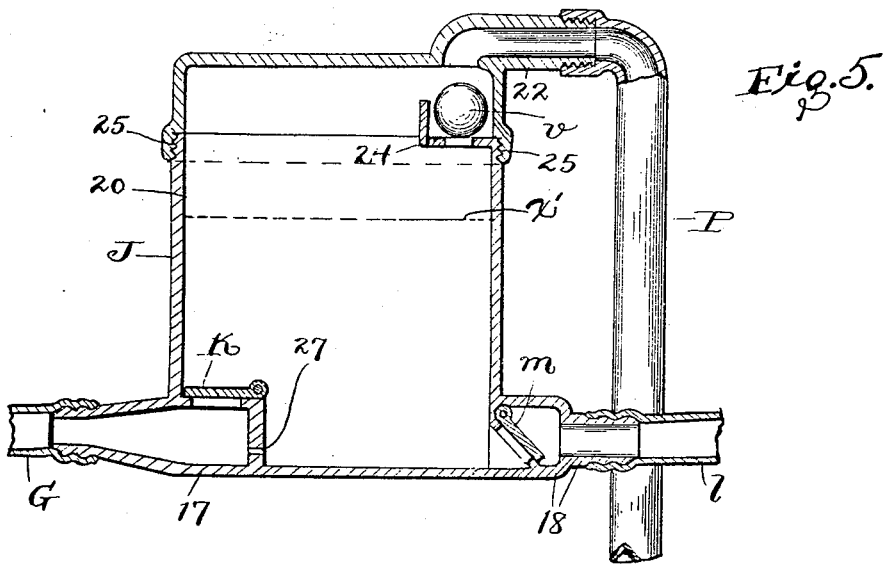

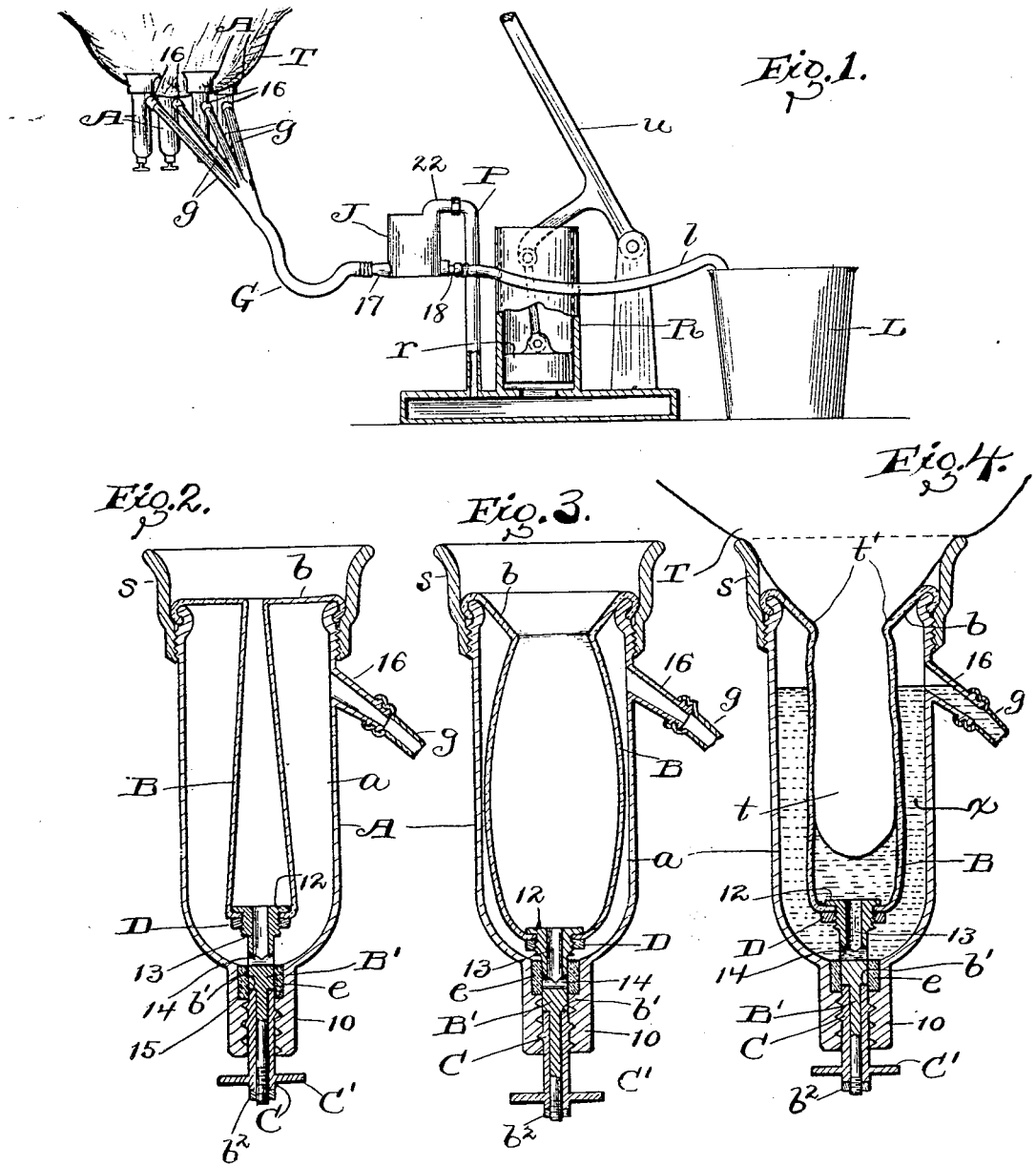

No. 870,785. PATENTED NOV. 12, 1907.
M. E. JACQUES.
MILKING APPARATUS.
APPLICATION FILED AUG. 11, 1906.

2 SHEETS—SHEET 2.

WITNESSES:

INVENTOR
Mia E. Jacques
BY
ATTORNEYS

UNITED STATES PATENT OFFICE.

MIA E. JACQUES, OF BUFFALO, NEW YORK.

MILKING APPARATUS.

No. 870,785.  Specification of Letters Patent.  Patented Nov. 12, 1907.

Application filed August 11, 1906. Serial No. 330,165.

*To all whom it may concern:*

Be it known that I, MIA E. JACQUES, a citizen of the United States of America, residing at Buffalo, in the county of Erie and State of New York, have invented certain new and useful Improvements in Milking Apparatus; and I hereby declare the following to be a full, clear, and exact description of the invention, such as will enable others skilled in the art to which it pertains to make and use the same.

This invention relates to improvements in milking apparatus suitable for use in milking cows.

The general object of this invention is to provide milking apparatus, which, in principle of operation, operates like the suck of a calf; which is simple in construction, light, strong, durable and easily cleaned; which can be readily applied and conveniently operated without injury to the animal being milked; which effectually excludes foreign matter and deleterious bacteria from the milk in milking the animal, and which is capable of operation without loss of milk.

With this general object in view, and to the end of realizing other advantages hereinafter appearing, this invention consists in certain features of construction, and combinations of parts, hereinafter described and pointed out in the claims.

Referring to the drawings, Figure 1 is a side elevation of milking apparatus embodying my invention. Portions are broken away and in section in this figure to more clearly show certain features in the construction, and the apparatus is shown applied to the teats of the animal to be milked. Figs. 2, 3 and 4 are central vertical sections illustrating one of the teat-cups of my improved milking apparatus. Fig. 2 shows the cup before its application to the teat. Fig. 3 shows the expansible bag expanded within the cup to the extent required to render the said bag capable of being slipped onto the teat. Fig. 4 shows the cup, with the internal bag thereof embracing and attached to the teat. Fig. 5 is a central vertical section of a receptacle which forms a portion of my improved milking apparatus and into the lower portion of which milk is drawn during the operation of the apparatus by suction created within the upper portion of the interior chamber of the said receptacle.

My improved milking apparatus comprises four teat-cups A adapted to be applied (see Figs. 1 and 2) to the teats *t* of the udder T of the cow or animal to be milked. Each cup A (see Fig. 2) is provided interiorly with a chamber *a*.

Within and centrally of the chamber *a* is arranged an expansible elastic bag B which is made of rubber or other suitable elastic material which is stiff enough to have a tendency to retain the normal shape of the bag. The bag B terminates at its upper end and externally in an annular lip *b* which in the normal position of the bag is arranged horizontally or transversely of the upper end of the cup A and extends around the upper end of the bag. The lip *b* is attached to the upper end of the cup A in any approved manner so as to form an air-tight joint between the said lip and the cup. The lip *b* covers and thereby closes the chamber *a* around the upper end of the bag B which is normally open at the said end. The bag B is normally larger in transverse area at its lower end than at the upper end of the bag and tapers preferably toward the last-mentioned end. The size transversely of the central and upper portion of the bag B is such relative to the size of the teat that expansion of the bag is required to accommodate the reception by the bag of the teat. The bag B has such length relative to the teat that the latter upon the application thereto of the teat-cup, will not extend to the lower end of the interior chamber of the bag, and the lower portion of the bag is of such size transversely that any sealing of the outer and milk-discharging end of the teat is positively avoided.

The cup A is preferably made of metal that will not rust.

The cup A (see Fig. 2) extends a suitable distance below the bag B and at its lower end and centrally is provided with a depending tubular member 10. The lower portion of the member 10 is screw-threaded internally and a correspondingly externally threaded tubular screw C is screwed into the said chamber 10, extending from below the member 10 upwardly a suitable distance.

The bag is provided at its lower end with a depending stem B′ which extends vertically through and has lateral bearing in the screw C. The stem B′ extends into the lower portion of the chamber *a* and into the lower end of the bag B. The stem B′ is suitably attached to the bag B, and the joint formed between the bag and the said stem is rendered fluid-tight in any approved manner. Preferably the stem B′ terminates within the bag B in a head 12 which forms the bottom of the interior chamber of the bag.

The upper portion of the stem B′ is externally screw-threaded next below the bag B, and a correspondingly threaded nut D is mounted on the last-mentioned portion of the stem next below the bag B, and the lower end of the bag is clamped by and between the head 12 and the nut D.

The stem B′ (see Fig. 2) is provided in its upper portion with a port 13 arranged centrally and longitudinally of the said portion of the stem and extending from the upper extremity of stem downwardly a suitable distance and communicating at its lower end with a port 14 which extends transversely of and through the stem. The port 14 in the normal position of the parts is, as shown in Fig. 2, in communication at its ends with the chamber *a*. Consequently the ports 13 and 14 form a passage-way which in the normal position of the parts establishes communication between the interior chamber of the bag and the cup-chamber a.

The depending member 10 of the cup (see Fig. 2) is provided within its upper portion with a tubular washer e which occupies a recess 15 formed in the upper end of the said cup-member 10 around the stem B′ and snugly embraces the stem, forming a fluid-tight joint between the stem and the said cup-member 10.

The stem B′ is provided externally and at the upper end of the screw C with a shoulder b′ which overhangs or overlaps the said end of the screw. The stem B′ extends below the screw C a suitable distance and is externally screw-threaded below the screw, and a correspondingly threaded nut $b^2$ is mounted on the stem next below the lower end of the screw. The screw C is provided at its lower end with a handle C′ for convenience in turning the screw.

By the construction hereinbefore described it will be observed that the stem B′ is shiftable endwise or vertically by the manipulation of the screw C; that the said stem is shiftable endwise in the one direction or the other according as the screw C is turned in the one or the other direction; that the screw C is shifted downwardly or upwardly according as the screw is turned in the one direction or the other; that the engagement of the lower end of the screw C with the nut $b^2$ lowers the stem B′ upon turning the screw in one direction and the engagement of the upper end of the screw with the shoulder b′ lifts the stem B′ upon turning the screw in the other direction; that in the upper and normal position of the stem B′ the port 14 (lower end of the passage-way formed by the ports 13 and 14) and consequently the interior chamber of the bag B is in communication with the cup-chamber a, as shown in Fig. 2; that in the lower position of the stem B′ the port 14 is surrounded and closed by the washer e and communication between the cup-chamber a and interior chamber of the bag B is interrupted, as shown in Fig. 3. It will be observed therefore that the bag B is suspended within and surrounded by the chamber 12 of the cup A and attached at its lower end to a vertically shiftable member B′ which is provided interiorly with a passage-way which is continually in communication with the interior chamber of the bag and in or out of communication with the cup-chamber a according as the said member B′ is in its upper or lower position.

The cup A is provided a suitable distance above the lower end of the bag and at one side with a laterally and downwardly projecting hose-connection 16, and, as shown in Fig. 1, the hose-connections 16 of the four teat-cups of my improved milking apparatus are connected and in communication with the different branches g of a hose or flexible tube G which is connected and in communication with the milk-inlet-forming hose-connection 17 of a receptacle J which is made preferably of material that will not rust or injure the milk. The hose-connection 17 (see Fig. 5) is preferably located at the bottom of the receptacle J at one side of the receptacle, and the said receptacle is provided at its opposite side and at the bottom with a milk-outlet-forming hose-connection 18 which in Fig. 1 is shown connected and placed in communication by a hose or flexible tube l with a pail or receptacle L which is to be supplied with milk. The hose-connections 17 and 18, as already indicated, constitute the milk-inlet and milk-outlet respectively of the interior chamber 20 of the receptacle J.

The receptacle J (see Fig. 5) is provided at the inner end of the inlet 17 with a flap-valve K which is arranged to swing upwardly into the chamber 20 in opening and suitably seated in its normal and closed position. The receptacle J is provided at the inner end of the outlet 18 with a flap-valve m which is arranged to swing upwardly into the said inlet in opening and suitably seated in its normal and closed position. The valves K and m control the passage of milk through the hose-connections 17 and 18 respectively and are preferably arranged to be normally seated by gravity.

The receptacle J is provided with an auxiliary orifice or perforation 27 which establishes communication between the chamber 20 and the inlet 17 of the said chamber so that during the operation of the milking apparatus the passage-way between the said chamber and the teat-cups will be continually supplied with milk and there will be a continual flow of milk into the lower end of the said chamber from the teat-cups, as will hereinafter more clearly appear.

The receptacle J is provided at its upper end and at one side with a laterally projecting pipe-connection 22 which is in communication at its inner end with the chamber 20. A pipe P is attached at one end to the pipe-connection 22 and communicates with the chamber 20, and at its other end is placed in communication in any approved manner with the lower end of the interior chamber of a cylinder R, and a suction-creating piston r is arranged and adapted to be reciprocated endwise within the cylinder, being operatively connected in any approved manner with a suitably supported lever u. In the normal position of the parts the piston r is in its extreme lower position as shown in Fig. 1, and obviously suction is created on the body of liquid within the milk-receiving chamber 20 during the upward or drawing strokes of the piston during the reciprocation of the piston.

To guard against the rise of the level of milk within the chamber 20 into the pipe-connection 22 of the receptacle J a floatable ball-valve v (see Fig. 5) is seated a short distance below the inlet of the said pipe-connection upon a bracket 24 with which the receptacle J is interiorly provided. To accommodate a convenient assemblage of the parts the receptacle J is preferably composed of an upper section and a lower section, with the upper section screw-threaded interiorly at its inner end and screwed, as at 25, onto the correspondingly externally threaded upper end of the lower section, and with the bracket 24 formed upon the lower section.

My improved milking apparatus operates as follows:—The stem B′ of the bag B of each teat-cup is lowered to interrupt communication between the bag and the cup-chamber a whereupon the suction-creating piston is lifted or actuated outwardly far enough to produce a partial vacuum and enough suction in the said chamber to result in the expansion of the bag B as shown in Fig. 3 and accommodate the reception by the bag of the teat to be embraced by the bag, whereupon the cup is applied to the teat. As soon as the cup has been applied the stem B′ of the bag B of the cup is elevated into its upper or normal position as shown in Fig. 4 so as to establish communication between the chamber $a$ and the bag of the cup and permit of the contraction of the bag upon the teat, which contraction will squeeze the teat more especially at the root of the teat and thereby force milk from within the teat into the bag below the teat, thence through the passage-way formed by the ports 13 and 14 in the aforesaid stem into and through the chamber $a$ into the hose or tube $g$ from which the milk is conducted through the lower end of the receptacle J to the pail or receptacle L. The pressure of the bag B on the teat is sufficient to retain the cup in position upon the teat regardless of subsequent suction created within the chamber $a$ of the cup during the milking operation. The bag B of each cup A will be filled below the teat by the first discharge of milk from the teat and the lower and discharging end of the teat will be submerged in milk until the animal has been completely milked. The cup-chamber $a$ fills with milk to a point opposite the outlet 16 of the said chamber, as shown in Fig. 4 wherein $x$ indicates milk, and as the said outlet is arranged at a point above the exposed lower and milk-discharging end of the teat any suction created during the operation of the suction-creating piston $r$ will never directly act upon the teat but only upon the milk already drawn from the teat. The suction created during each suction-creating stroke of the piston $r$ raises the level $x'$ (see Fig. 5) of the body of milk within the chamber 20 of the receptacle J. During each upward or suction-creating stroke of the piston the valve K is opened by the suction created within the upper portion of the milk-chamber 20 and the valve $m$ remains closed during the said piston-stroke. During the downward or vacuum-relieving stroke of the plunger the valve K is closed while the valve $m$ opens to permit the flow of milk from the lower end of the chamber 20 to the pail or receptacle L. Obviously the auxiliary perforation 27 accommodates a backward passage of fluid during the suction-relieving stroke of the piston and assists in relieving the vacuum. It will be observed therefore that during the reciprocation of the piston a gradually increasing or strong suction and a gradually diminishing suction are alternately had upon the surface of the milk in the milk-chamber 20. Such increasing suction and diminishing suction alternately operate to expand the bags B of the teat-cups A and then to permit the said bags to contract, thereby drawing the milk by suction and consequently somewhat enlarging the teats by filling them full of milk from the udder of the animal and then reducing the amount of suction but continuing to force milk from the teats by the contraction of the bags B of the teat-cups. In other words, the operation of the apparatus is such as to create suction which alternately increases and diminishes, and a pressure upon and externally of the teats which alternately increases and diminishes, thereby producing a constant flow of milk from the teats.

It will be observed that the operation of the apparatus after the teat-cups have been applied in a milking position and communication established between the bag B and the chamber $a$ of each teat-cup the pressure of the bag upon the teat is never entirely relieved at the root of the teat, but that it is sufficiently relieved during the maximum milking suction to allow the teat to expand enough for a full influx of milk thereinto, so that the sealing of the mouth of the teat-cup against the root of the teat is never broken, thus effectually preventing any admission of air from around the teat. Also, the teat, at the moment when the bag of the teat-cup is at its maximum expansion during the milking operation and therefore least snugly embracing the teat, is drawn into the cup by the maximum milking suction and thereby positively prevents a break in the frictional contact between the bag and the root of the teat. The maximum milking suction provided for is however not sufficient to entirely overcome the friction resulting from the pressure of the bag upon the root of the teat so that undue elongation of the teat or the drawing of the teat too far into the cup is avoided. It will be observed also that each bag B is so shaped at the upper end or mouth of the cup that it will form more or less of a depression in the teat at the point of contact with the teat (see Fig. 4) so as to leave an abutting shoulder $t'$ on the teat next above, so that, upon the expansion of the bag and the simultaneous maximum milking suction, the bag will be drawn upwardly against the said shoulder; but because of the shoulder a sealing between the bag and the teat will be maintained without the sliding of the teat farther into the bag, and the tendency is to draw the bag upwardly. The friction between the teat and the transversely smallest part of the bag will tend to contract rather than elongate the teat at the upper end of the bag.

Another point to which I would call attention and which is of material assistance to the perfect operation of the milking apparatus, is the retention of the lower end of the cup-bag B in a more expanded form than the upper end of the bag by any suitable means, as, for instance, the head 12 of the stem B' shown, and the operation of the restricted upper end of the bag as a valve to close the milk-passages in the teat at the root of the teat as soon as the pressure by the bag during the contraction of the bag is exerted upon the teat, thus preventing the pressure of said bag upon the teat from forcing the milk backwardly from the teat into the udder. It will be observed that by my improved apparatus even a slight sealing of the outer or milk-discharging end of the teat, is avoided because the lower end of the bag B of the teat-cup is held by the engaging stem-head 12 in such position that contraction of the said end of the bag is effectually prevented and any pressure upon the muscles and tissues in the outer or milk-discharging end of the teat is avoided and the discharge of milk by the teat never interrupted or interfered with.

It will be observed that in my improved apparatus the portions of the teats of the animal being milked which are exposed within the bags of the teat-cups are kept submerged in the milk in the said bags, and this is important because the suction on the milk in which the teats are submerged is transmitted directly to the milk in the teats so as to cause a shrinkage rather than a distention of the teats. In other words, in the operation of my improved apparatus, there is no vacuum in the teat-cups externally of the teats, there is no vacuum formed internally of the teats or udder, but there is a suction created upon the level of the milk in the milk-chamber 20 of the receptacle J, which suction, pulling 870,785 upon the milk in the udder of the animal, causes milk to flow from the udder to the said receptacle.

To guard against the falling of the teat-cups off from the teats or udder during the operation of apparatus, should the suction of the apparatus become deranged or improperly handled, but without interfering with a successful operation of the apparatus, the upper end of each teat-cup A is screw-threaded externally and an annular shell s which has a correspondingly internally threaded lower end is screwed onto the said end of the cup. The shell s flares upwardly and is adapted to engage at its upper end with the udder T, as shown in Fig. 4. It is obvious that with the upper edge of the shell s normally in position against the udder, as shown in Fig. 4, should the bag B be expanded sufficiently to entirely leave the teat the suction formed around the teat would have a tendency to draw upon the whole teat-cup apparatus and to expand the teat at its root into the chamber formed within the shell s, thereby causing the said shell to be frictionally held against the udder.

What I claim is:—

1. In milking apparatus, the combination, with a teat-cup having an interior chamber provided with an outlet, which cup is provided at and centrally of the bottom of the said chamber with a tubular depending member having its lower portion screw-threaded internally, said cup having an expansible elastic bag arranged centrally of the said chamber and depending into suitable proximity to the bottom of the chamber and open at the upper end, which bag has such dimensions relative to the teat to which it is to be applied that the bag requires to be expanded to receive the teat and will extend below the teat when applied, said bag being provided at its upper end and externally with a lip which closes the aforesaid chamber around the upper end of the bag and is attached to the surrounding wall of the said chamber, and means whereby suction is created and relieved alternately within the aforesaid outlet, of an endwise shiftable stem extending downwardly from within and attached to the bag and provided at its upper end with a head which is arranged within and forms the bottom of the interior chamber of the bag, said stem being provided interiorly of its upper end with a passage-way which extends longitudinally of the upper portion of the stem and communicates at its upper end with the bag-chamber and has its lower end below or in communication with the first-mentioned chamber according as the stem is in its lower or upper position; a screw screwed into the aforesaid internally threaded depending member of the cup and operatively connected with the aforesaid stem, and a washer snugly embracing the stem within the upper portion of the said internally threaded depending member of the cup and arranged to close the lower end of the aforesaid passage-way in the lower position of the stem.

2. In milking apparatus, the combination, with a teat-cup having an interior chamber provided with an outlet, which cup is provided at and centrally of the bottom of the said chamber with a tubular depending member, said cup having an expansible elastic bag arranged centrally of the said chamber and depending into suitable proximity to the bottom of the chamber and open at its upper end, which bag has such dimensions relative to the teat to which it is to be applied that the bag requires to be expanded to receive the teat and will extend below the teat when applied, said bag being provided at its upper end and externally with a lip which closes the aforesaid chamber around the upper end of the bag and is attached to the surrounding wall of the said chamber, and means whereby suction is created and relieved alternately within the aforesaid outlet, of an endwise shiftable stem extending downwardly from within and attached to the bag and provided at its upper end with a head which is arranged within and forms the bottom of the interior chamber of the bag, said stem being provided interiorly of its upper end with a passage-way which communicates at one end with the interior chamber of the bag and has its lower end below or in communication with the first-mentioned chamber according as the stem is in its lower or upper position; means for actuating the stem, and a washer snugly embracing the said stem within the upper portion of the aforesaid depending tubular member of the cup and arranged to close the lower end of the aforesaid passage-way in its lower position.

3. In milking apparatus, the combination, with a teat-cup having an interior chamber provided with an outlet, which cup is provided with an expansible elastic bag arranged centrally of the said chamber and depending into suitable proximity to the bottom of the chamber and open at its upper end, which bag has such dimensions relative to the teat to which it is to be applied that the bag requires to be expanded to receive the teat and will extend below the teat when applied, said bag being provided at its upper end and externally with a lip which closes the aforesaid chamber around the upper end of the bag and is attached to the surrounding wall of the said chamber, and means whereby suction is created and relieved alternately within the aforesaid outlet, of means for controlling communication between the aforesaid chamber and the interior chamber of the bag below the bag.

4. In milking apparatus, means for holding the lower and milk-discharging portion of the teat or teats submerged in milk discharged from the teat or teats during the milking operation; means for conducting milk from the teat-submerging milk, and means whereby a constant flow of milk from the teat or teats is established during the milking operation.

5. In milking apparatus, means for holding the lower and milk-discharging portion of the teat or teats submerged in milk discharged from the teat or teats during the milking operation; means for conducting milk from the teat-submerging milk, and means whereby a pressure externally of and against the teat or teats to discharge milk therefrom is created and relieved alternately.

6. In milking apparatus, means for holding the lower and milk-discharging portion of a teat submerged in milk discharged from the teat during the milking operation; means for conducting milk from the teat-submerging milk, and apparatus whereby suction upon the teat-submerging milk is not only created and relieved alternately but pressure externally of and against the teat to discharge milk therefrom is created and relieved alternately.

7. In milking apparatus, the combination, with a receptacle for receiving milk, and teat-cups provided each with an interior chamber having a milk-outlet and an expansible elastic bag which is arranged within the said chamber and depends into suitable proximity to the bottom of the chamber, which bag is open at its upper end and attached to the surrounding wall of the said chamber and requires to be expanded to receive the teat, of an intermediate milk-receiving chamber interposed between the aforesaid receptacle and the teat-cups and provided at the bottom with a milk-inlet and a milk-outlet communicating with the said receptacle and first-mentioned chamber respectively; a valve controlling the passage of milk through the milk-inlet and arranged to open by suction created within the intermediate chamber; a valve controlling communication between the intermediate chamber and the milk-outlet and arranged to be held closed during the creation of suction in the said chamber and free to open upon the relief of the said suction, and means whereby suction is created and relieved alternately within the intermediate chamber.

8. In milking apparatus, the combination, with a receptacle for receiving milk, and teat-cups provided each with an interior chamber having a milk-outlet and an expansible elastic bag which is arranged within the said chamber and depends into suitable proximity to the bottom of the chamber, which bag is open at its upper end and requires to be expanded to receive the teat, of an intermediate milk-receiving chamber interposed between the aforesaid receptacle and the teat-cups and provided with a milk-inlet and a milk-outlet communicating with the said receptacle and first-mentioned chamber respectively, which chamber has an auxiliary perforation establishing communication between the said chamber and the said inlet; a valve controlling the passage of milk through the milk-inlet and arranged to open by suction created within the intermediate chamber; a valve controlling communication between the intermediate chamber and the milk-outlet and arranged to be held closed during the creation of suction in the said chamber and free to open upon the relief of the said suction, and means whereby suction is created and relieved alternately within the intermediate chamber.

In testimony whereof, I sign the foregoing specification, in the presence of two witnesses.

MIA E. JACQUES.

Witnesses:
W. T. MILLER,
W. E. JACQUES.